(12) United States Patent
Mandel et al.

(10) Patent No.: US 6,574,014 B2
(45) Date of Patent: Jun. 3, 2003

(54) AUTOMATIC BOOK PAGE TURNER FOR IMAGING

(75) Inventors: Barry P. Mandel, Fairport, NY (US); Lotfi Belkhir, Los Gatos, CA (US); William R. Burger, Fairport, NY (US); Thomas E. Sollitt, Fairport, NY (US); Scott Miller, Rochester, NY (US); Eduard Kaminker, Rochester, NY (US); Thomas N. Taylor, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 103 days.

(21) Appl. No.: 09/966,430

(22) Filed: Sep. 28, 2001

(65) Prior Publication Data

US 2003/0063334 A1 Apr. 3, 2003

(51) Int. Cl.[7] .................................................. H04N 1/04
(52) U.S. Cl. ...................... 358/474; 358/498; 358/471; 248/455; 355/25; 399/362
(58) Field of Search ................................. 358/471, 474, 358/498, 497, 400, 401, 473, 472, 505, 501, 296; 355/25, 82; 399/362–365, 368; 271/191, 193; 281/45, 42; 84/487; 116/234; 40/531; 248/455, 454, 457, 447

(56) References Cited

U.S. PATENT DOCUMENTS

| 3,484,970 | A | | 12/1969 | Berlinsky et al. | 40/531 |
|---|---|---|---|---|---|
| 3,550,296 | A | | 12/1970 | Castagna | 40/531 |
| 3,800,453 | A | | 4/1974 | Kroes | 40/531 |
| 3,939,587 | A | | 2/1976 | Weststrom | 40/531 |
| 4,102,071 | A | * | 7/1978 | D'Arcy | 40/531 |
| 4,121,361 | A | * | 10/1978 | D'Arcy | 40/531 |
| 4,346,641 | A | * | 8/1982 | Kobayashi | 84/487 |
| 4,432,154 | A | * | 2/1984 | D'Arcy | 40/531 |
| 4,488,367 | A | * | 12/1984 | Yamauchi et al. | 40/531 |
| 4,545,141 | A | | 10/1985 | Ito et al. | 40/531 |
| 4,644,675 | A | * | 2/1987 | Berger et al. | 40/531 |
| 4,663,873 | A | | 5/1987 | Shinbrot | 40/531 |
| 4,673,286 | A | | 6/1987 | Shinbrot | 355/25 |
| 4,916,839 | A | | 4/1990 | Nakanishi | 40/475 |
| 4,942,482 | A | | 7/1990 | Kakinuma et al. | 358/474 |
| 5,247,755 | A | * | 9/1993 | Sato et al. | 40/531 |
| 5,325,213 | A | | 6/1994 | Takahashi et al. | 358/474 |
| 5,351,927 | A | * | 10/1994 | Howell | 248/455 |
| 5,390,033 | A | | 2/1995 | Bannai et al. | 358/498 |
| 5,471,277 | A | | 11/1995 | Fujioka et al. | 355/25 |
| 5,612,791 | A | | 3/1997 | Turner et al. | 358/497 |
| 5,640,252 | A | | 6/1997 | Turner et al. | 358/497 |
| 5,777,660 | A | * | 7/1998 | Ard | 348/455 |
| 6,056,258 | A | * | 5/2000 | Swartz et al. | 348/455 |
| 6,323,963 | B1 | * | 11/2001 | Takahashi | 358/474 |
| 6,459,505 | B1 | * | 10/2002 | Swartz et al. | 358/474 |

* cited by examiner

Primary Examiner—Cheukfan Lee

(57) ABSTRACT

The pages of a book being held at least partially open may be sequentially automatically turned over from one side of the book to the other by pivoting an elongated arm from one side of the book toward the other and turning over individual pages with a vacuum head pivoting relative to the elongated pivoted arm about a different pivot axis as the elongated arm moves to reduce undesirable forces on the individual book pages being turned over. The vacuum head may initially pivot to bend the edge of an individual page up away from the book, to aid in page separation, and then subsequently differently pivot to help peel the same page gently away from the vacuum head and flip it over onto the opposite side of the book. This may be assisted by moving frictional belts on the vacuum head.

22 Claims, 10 Drawing Sheets

AUTOMATIC BOOK PAGE TURNER FOR IMAGING

Disclosed in the embodiments herein are improved systems and methods for automatically sequentially turning over the pages of a book, such as to provide for their improved sequential digital imaging or viewing, with rapidity, reliability and safety (minimizing damage to delicate or valuable books). Further disclosed in these embodiments are improved systems and methods for improving book page turning systems by improved flattening and/or holding book pages stationary for improving the imaging of the book, which may be provided automatically in automatic coordination with automatic sequential page turning.

Page turning technology for reading or imaging extends back in time for at least approximately 100 years, to an automatic page turner developed for reading U.S. plural page folded census forms for example, and to various special devices built for the photocopying or microfilming of official records and other books. However, even though page turning and imaging is a long-standing art, there continue to be problems, and/or a lack of suitable products, for providing various desired features of low cost, speed, reliability (prevention of skipped pages, pluralfed pages, or folded-over pages, etc.), and/or protection from damage of old, fragile paper, and/or rare or valuable books.

With the development of improved and lower cost digital imaging, digital data storage, OCR, data compression, and data transmission technologies, as well as electronic books, the internet, "on demand" printing, remote printing, the "information explosion", etc., there is an increased need for more rapidly, reliably and safely automatically digitally reading and storing the pages of many prior hardcopy books, including out of print books, especially conventionally bound books (but also books in the broader sense of paper brochures, pamphlets, etc.). Improvements in laser or multipixel imager (e.g., linear and two-dimensional imaging arrays), image processing and manipulation, digital OCR, etc., have made digital imaging of physical (hardcopy) printed books much easier, cheaper and faster. Optics and software has even been developed for compensating for image distortion from the inherently curved surfaces that an opened thick edge-bound book typically has unless subjected to excessive flattening pressures that could damage the binding.

However, the development of technology for sequentially suitably presenting the pages of books for such imaging (broadly referred to as book page turning herein) has not kept up. Especially, for doing so automatically but nondestructively, without cutting out the pages of a book into separate sheets to be imaged manually or fed by an automatic document feeder into a conventional sheet imaging device such as a digital scanner/copier. Much book imaging has heretofore actually been done by sending books to third world countries for reducing the costs of fully manual copying, with inherent delays. Some specialized niche market devices for turning pages for handicapped people to read have also been developed, not suitable for accurate higher speed book page digital imaging systems.

Many government, educational, and commercial institutions have huge libraries of printed books they would like to transfer into digital formats to reduce the costs of storage, make the information available remotely, and make the information available for electronic searching. This increases the need for a system able to turn large numbers of book pages quickly and reliably and also to hold these sheets stationary, and flatter, for imaging.

Various apparatus for automatically turning the pages of books are known in the art. The following patent disclosures are noted by way of some examples (some of which also show or describe book imaging systems): Ricoh U.S. Pat. No. 5,390,033, issued Feb. 14, 1995, on a face up digital book scanner and page turner, and other art cited therein; and the following Xerox Corp. U.S. Pat. Nos.: 3,484,970—Automatic Sheet Turner Using A Rotating Vacuum Head; 3,800,453—Page Turning Device; 3,939,587—Page-Turner for Books and the Like; 4,102,071—Automatic Page Turning Apparatus; U.S. Pat. No. 4,545,141—Automatic Document Page Turning Apparatus; 4,663,873—Page Flipper for Book Copying; 4,673,286—Frictionless Vacuum Feeder for Book Copying; 4,916,839—Page Turning Apparatus; 4,942,482—Automatic Page-Turning Device; U.S. Pat. No. 5,325,213—Image Reader and Book Document Reader with a Page Turning Capability for an Image Forming Apparatus; 5,471,277—Book Document Reading Device Having a Page Turning Capability; and 5,612,791—Bound Document Imager with Air Jet Page Turning System.

Of particular interest as to the concept of using a vacuum head on a pivoting arm to acquire and turn the pages of a book are U.S. Pat. No. 3,550,296 issued Dec. 29, 1970 to J. F. Castagna; and Xerox Corp. U.S. Pat. No. 5,640,252 issued Jun. 17, 1997 to William D. Turner, et al; and other art cited therein.

Also noted as to book copying background art, as to various book imaging systems, and book holding systems, are: U.S. Pat. Nos. 3,888,584—Semi-Automatic Document Handler; Rank Xerox 4,068,950—Variable Platen Cover; Xerox Corp. 4,143,960—Retractable Support Member; 4,693,594—Platen Transport and Vacuum Plenum for Book Copying; 4,793,812—Hand Held Optical Scanner for Omni-Font Character Recognition; 4,980,720—Document Reproduction Machine with Enhanced Book Copying Capability; 5,012,275—Right-to-Left Scanning System for Copying Documents or Bound Books; 5,084,732—Book Copying Machine; 5,119,206—System for Printing Bound Documents; 5,177,617—Book Edge Copier Inversion Sorting; 5,212,568—Method and Apparatus for Scanning a Signature Document; 5,276,530—Document Reproduction Machine with Electronically Enhanced Book Copying Capability; 5,359,207—Wedge Scanner Utilizing Two Dimensional Sensing Arrays; 5,475,505—Canted Platen Input Scanner; 5,619,302—Apparatus and Method for Scanning a Bound Document Using a Wedge Shaped Platen; 5,636,006—Apparatus and Method for Scanning a Bound Document Using a Wedge Shaped Platen with a Moving Mirror; 5,726,775—Method and Apparatus for Determining a Profile of an Image Displaced a Distance From a Platen; 5,760,925—Platenless Book Scanning System with a General Imaging Geometry; 5,764,383—Platenless Book Scanner with Line Buffering to Compensate for Image Skew; 5,835,241—Method for Determining the Profile of a Bound Document with Structured Light; 5,847,846—Apparatus and Method for Scanning a Bound Color Document Using a Wedge Shaped Platen; and 6,056,258—Bound Document Imager.

Further by way of background art, the protecting of a book's binding while copying or imaging the book by holding the book in a "V" configuration, rather than flat, typically with an inclined "corner" or "roof" type platen, is disclosed in various of the above-cited patents. Such a V-shaped book platen and/or book cradle is disclosed with a digital scanner in, for example, the above-cited Xerox Corp. U.S. Pat. Nos. 6,056,258, issued May 2, 2000; 5,475,505 issued on Dec. 12, 1995; and also in 5,847,846. Additionally noted on a "roof" type platen for a book copier system is a Xerox XDJ publication Vol. 12, No. 5, September/October 1987, pp. 231–2. Also, U.S. Pat. No. 4,585,334 based on a GB 034478 of 24.12.83, by the British Library Board, in which apparently the book is held right-side up in a V-shaped book support and scanned by an overlying wedge shaped surface scanner housing with a window in one face. Also noted is a German DE 3546404-A1 Offenlegungstag of 2.7.87 with a roof shaped double platen for simultaneous copying of book pages.

As noted, disclosed in the embodiments herein is an improved book page turning system including an improved system for automatically flattening and holding, after each turned-over book page, the exposed pages of the open book, to retain the open book pages flatter for improved viewing and/or imaging, e.g., with less optical distortion, and for reducing the tendency of stiff book pages to move and/or stand back up after being turned. As disclosed herein, this may be done without having to hold a heavy glass plate "V" or half-V platen against the open book, or vice-versa, optically interposed in between the book text and the book imaging system as in much of the above-cited art. Such a glass plate platen may become optically contaminated by paper lint, etc. Also, intermittently imposing a glass platen may require a relatively high powered and heavy mechanism for rapidly moving such a heavy glass book platen or pressing plate up and down to allow for the next page to be lifted up and turned over before providing each page imaging. Also, pressing a large flat glass platen heavily against the entire page, or both pages, of an open bound book, or vice versa, can damage the book binding, or even damage delicate image areas of a book, such as delicate page inserts, attachments, photographs, smearable or flakeable inks, or the like.

As shown in these embodiments, the open book pages flattening system disclosed herein can even operate without ever touching the text, or other imageable portions of the book. That is, by engaging only, or almost only, the central edge margins or "gutter" of the book, to push the upper pages outwardly toward the book edge. As also disclosed in the embodiments, this can desirably be done in cooperation with then clamping the outer edge margin(s) of the book page(s) after the flattening operation, before the removal of the flattening member, and before the imaging, to hold the flattened page(s) stationary for imaging.

Because of the known factor of beam strength of paper or other print media sheets to resist curvature, and the typical curvature of those sheets when bound into an edge bound book which is opened for viewing, the pages of open books often bulge and/or move, especially after the pages have just been turned. If a page moves during a time in which the book is being scanned for being digitally imaged, for example, data can be lost and/or images distorted. Thus clamping the book pages during imaging to keep them from moving is desirable. Heretofore that has typically been done the same way as for the page flattening, by pressing the book down against a glass platen, or pressing a V-shaped glass platen down onto the open book, before and during imaging, as in the above-cited references, with significant disadvantages as discussed above. In contrast, the cooperative page clamping system shown in the embodiments also does not need to press against or engage the text areas of the open book.

With the disclosed embodiments, a book and its pages can be handled very gently, without tugging or pulling on the sheets, without bucking the sheets, without scuffing the image areas of the sheets, and without damaging the book binding or the book pages. Also, without interfering with or interposing obstructions, such as easily contaminated glass platens, in the optical path for imaging the pages of the open book. Even allowing both open book pages to be imaged at once, if desired. The disclosed embodiments can provide, along with the above and other advantages, positive single page acquisition, robust page separation, and gentle page flipping (turning) without excessive page bending.

A specific feature of the specific embodiments disclosed herein is to provide a method of book page turning in which the individual pages of a book which is being held at least partially open are sequentially automatically turned over from one side of the book to the other side of the book; the improvement comprising, sequentially pivoting an elongated pivotally mounted arm from one side of the book toward the other side of the book, turning over individual pages sequentially with a vacuum head which is pivotally mounted on said elongated pivotally mounted arm to move on said elongated pivoted arm from one side of the book towards the other side of the book, said vacuum head automatically pivoting relative to said elongated pivoted arm about a different pivot axis as said elongated pivotal arm moves from one side of the book towards the other side of the book to reduce undesirable forces on the individual book pages being turned over.

Further specific features disclosed in the embodiments herein, individually or in combination, include those wherein said pivotal mounting of said elongated pivotally mounted arm and said pivotal mounting of said vacuum head to said elongated pivotally mounted arm function as a dual pivot system enabling said vacuum head to initially pivot about said pivot axis to bend the edge of an individual page up away from the book to aid in page separation, and then to differently pivot said vacuum head about said pivot axis to help peel the same individual page gently away from said vacuum head and to flip the same individual page over onto the opposite side of the book with further pivotal movement of said elongated pivotally mounted arm, and/or wherein said pivot axis is offset from said elongated pivotal arm to allow said vacuum head to self-pivot in a selected direction as said elongated pivotal arm is pivoted, and/or in which said vacuum head initially pivots about said pivot axis to bend the edge of an individual page up away from the book to aid in a page separation, in which said pivot axis for said vacuum head is offset from the centerline of said elongated pivotal arm so that said individual pages are not put in substantial tension when so bending them during said page separation, and/or wherein said pivoting vacuum head further includes a finger extension that assists in flipping over said individual pages as said vacuum head releases them, and/or wherein said pivot axis of said vacuum head is adjustable for use with different size books, and/or wherein said vacuum head is pivoted relative to said elongated pivotal arm by a motor, and/or wherein said vacuum head is automatically pivoted relative to said elongated pivotal arm in coordination with the pivoted position of said elongated pivotal arm, and/or wherein said vacuum head has driven feed belts engaging an individual book page being turned over and operated in coordination with the position of the vacuum head to assist in turning over an individual book page, and/or wherein the book is supported in an at least partially opened manner in a generally V-shaped cradle, and/or wherein said individual book pages are sequentially imaged after said turning over of said individual pages sequentially by said sequentially pivoting of said elongated pivotally mounted arm with said pivotally mounted vacuum head from one side of the book toward the other side of the book, and/or a system for automatically turning the individual pages of a book having gutter margins and unprinted outer margin edges, with a book holder for holding the book at least partially open so that the book has first and second open sides, and with a book page turning apparatus for automatically sequentially turning over individual pages of the book from said first side of the book to the second side of the book; the improvement wherein said page turning apparatus for automatically sequentially turning over individual pages of the book from said first side of the book to the second side of the book comprises an elongated arm pivotal from one side of the book toward the other side of the book about a first pivot axis, and an individual book page acquisition member pivotally mounted to said elongated arm to move with said elongated pivoted arm from one side of the book towards the other side of the book, said individual book page acquisition member being pivotally mounted to said elongated arm about a second and different pivot axis to allow said individual book page acquisition member to pivot relative to said elongated arm as said elongated arm pivots from one side of the book towards the other side of the book about said first pivot axis, to reduce undesirable forces on the individual book pages being turned over, and/or wherein said individual book page acquisition member includes a vacuum head, and/or wherein said pivotal mounting of said elongated arm with said first pivot axis and said pivotal mounting of said individual book page acquisition member to said elongated arm with said second pivot axis provides a dual pivoting system enabling said individual book page acquisition member to initially pivot about said second pivot axis to bend the edge of an individual book page on the first side of the book up away from the book to aid in page separation, and then to differently pivot about said second pivot axis with further pivoting of said elongated arm about said first axis to help peel the same individual book page gently away from said individual book page acquisition member and to flip the same individual page over onto the second side of the book, and/or wherein said second pivot axis is offset from said elongated pivotal arm to allow said individual book page acquisition member to self-pivot in a selected direction about said second pivot axis as said elongated arm is pivoted about said first pivot axis, and/or wherein said individual book page acquisition member is a vacuum head, and wherein said vacuum head is mounted offset from the centerline of said elongated arm to initially pivot about said second pivot axis to bend the edge of an individual book page up away from the book to aid in an individual book page separation in the initial pivotal movement of said elongated arm away from said first side of the book without putting said individual book page in substantial tension, and/or wherein said individual book page acquisition member is a vacuum head which releases the individual book pages on the second side of the book and further includes a finger extension for assisting in the flipping over the individual pages as released from said vacuum head, and/or wherein said elongated arm is adjustable in length for use with different size books, and/or wherein said individual book page acquisition member is automatically pivoted relative to said elongated arm in coordination with the pivotal position of said elongated arm, and/or wherein said individual book page acquisition member is a vacuum head which automatically releases the individual book pages on the second side of the book and wherein said vacuum head is pivoted relative to said elongated arm by a motor, and/or wherein said individual book page acquisition member is a vacuum head which automatically releases the individual book pages on the second side of the book, and wherein said vacuum head is pivoted relative to said elongated arm by a motor, and wherein said vacuum head has at least one driven feed belt engaging an individual book page being turned over and operated in coordination with said automatic releasing to assist in turning over an individual book page, and/or further including an imaging system for sequential imaging of the individual book pages as they are sequentially turned over by said individual book page acquisition member by said sequentially pivoting of said elongated arm from the first side of the book towards the second side of the book.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "sheet" or "page" as alternatively used herein refers to a usually flimsy physical sheet of paper, plastic, or other suitable physical substrate for images. As is well known, for book printing with center binding, the book pages can be duplex printed "4-up," that is, printing four pages per printed sheet, two on each side, in "signatures" page order, and the printed sheet center folded and assembled with others into books and centrally bound. However, the term "book" as used in the claims herein broadly encompasses various different bound documents. The pages of most books have non-image (unprinted) margin areas on both their binding or inner edge and their outer edge.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular component mountings, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the examples below, and the claims. Thus, the present invention will be better understood from this description of these specific embodiments, including the drawing figures (which are approximately to scale) wherein:

Figure 1:
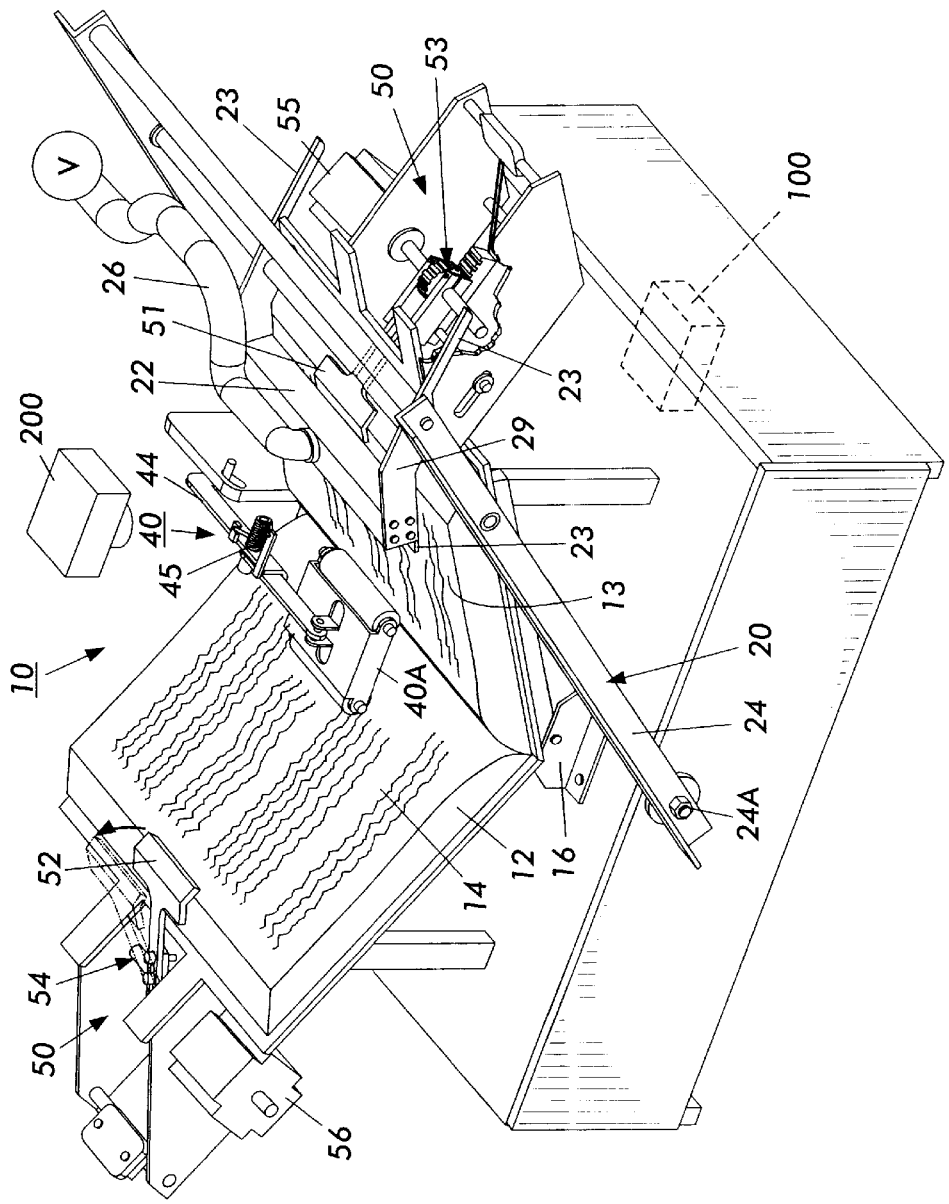
FIG. 1 is a perspective view (partially broken away) of one example of an integrated book page turning system, including a flattening and clamping system.
Figure 2:
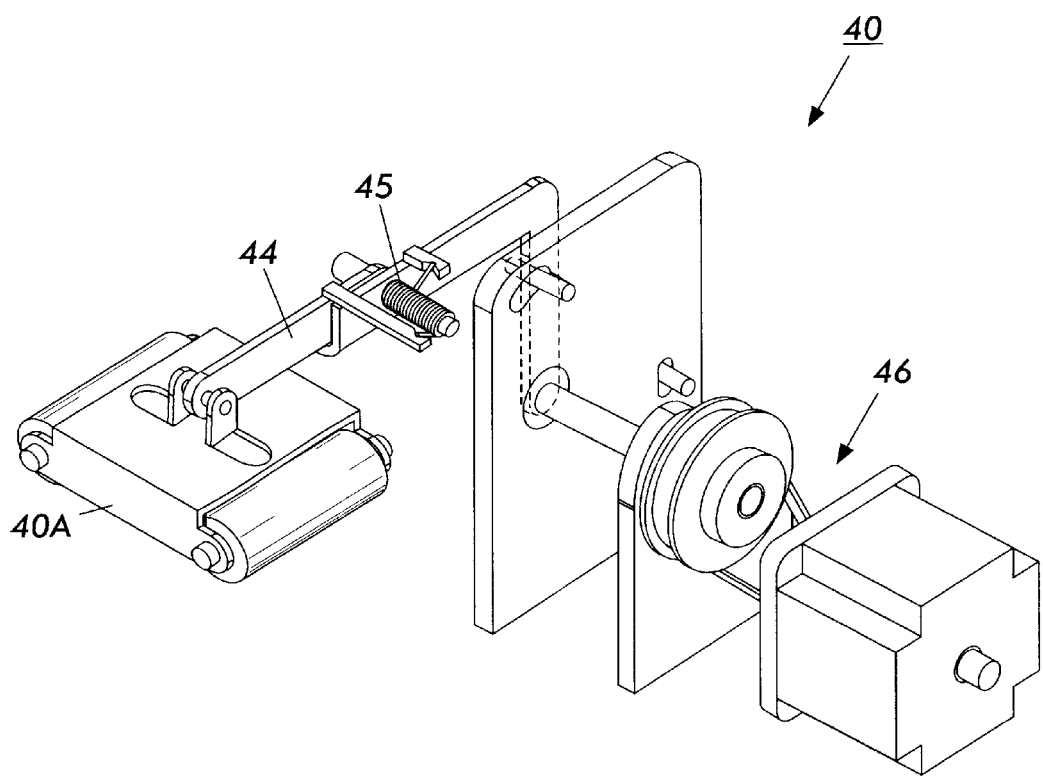
FIG. 2 is an enlarged partial perspective view of the flattening system of FIG. 1.

Disclosed in the illustrated embodiments, as one feature thereof, is a low cost apparatus and method for sequential turning over the pages of a book only one page at a time with a page separator and turner mechanism. As shown, this may be accomplished by a low-impact pivotally movable suction feed head (instead of a frictional nudger wheel, or the like).

This pivotal feed head may also have a flip-over system as the page is gripped and lifted over to the other side of the book. This may be a dual pivot system to enable the vacuum head to bend the edge (one side of) the exposed top page sheet upwardly, to aid in page separation, plus the action of then rotating the head to "peel" the sheet gently away from the vacuum head and flip the sheet over. This avoids the vacuum head and arm ending up underneath the "turned" page, and also not releasing that turned over page properly.

The disclosed embodiment mechanisms can sequentially turn the pages of a book into the proper position to enable an imaging device (which need not be discussed here) to sequentially capture all of the page images. This mechanism can be operated at page turning speeds of up to twenty pages per minute (PPM) or more. An operator may simply load a book into the device (possibly also adjusting some parameters for book thickness, width and length), and the rest can all be automatic. A bi-directional articulating vacuum head can acquire individual pages, pivot them radially, and then gently break the vacuum seal, and preferably deposits each page, turned over, and at least partially flattened, into an edge holding guide or clamp (as below).

Also disclosed in these embodiments is a low cost apparatus and method for sequential flattening and holding the pages of a book flatter for imaging after they are turned over, irrespectively of how they are turned over. As illustrated this may be with an exemplary coordinated system of at least one book center or spine pressure member that can be automatically pressed down on the center gutter and margin portion of the book for page flattening, coordinated with two actuated book side edge clamps. The center pressure member may include a limited amount of rotational freedom so that it can apply pressure to books of different thickness, and to books opened to any location. The motions of the book side edge clamps may be coordinated with the center pressure member to ensure the pages are held flatter during imaging with or without the continued presence of the flattening member. The center pressure member pushes down on any "bulges" in the book while the side clamps are open (released). After the side clamps are actuated and have a secure grip on the unprinted margin edges of the then top pages of the open book, the center pressure member may be retracted, leaving the printed areas of the pages of the book fully exposed for imaging with no obstructions in the optical path, and/or retracted for the next page turning.

Describing now in further detail the exemplary embodiments, with reference to the Figures shown in these illustrated embodiments, are examples of an integrated book page turning and flattening system 10, with variations or alternative components as will be described. This system 10 can provide improved book imaging, as may be done with a digital imaging system 200, shown schematically. A digital imaging system does not need to be described in any detail herein since that is not part of the improved aspects of this system, per se, and since various examples are described in the cited and other patents.

Shown here having its pages turned by the system 10 is an exemplary book 12, with opened (top) pages 13 and 14. The book 12 is shown supported in a "V" configuration, for binding protection (note the cited references on that subject), in book cradle 16. As an alternative embodiment, as shown in some of the abovecited patents, the book cradle can tilt or lift on one side relative to the other as a large (thick) book is being read.

The system 10 example here includes a page turning system 20 employing (in the embodiments of FIGS. 1, 4 and 5) a vacuum head system 22, on an articulating (pivotal) arm 24 driven by a motor M about axis 24A for single page acquiring and turning over to the other side of the book. The vacuum head system 22 may be connected by a vacuum manifold 26 to a conventional low pressure vacuum source "V." The vacuum head system 22 may also be provided with a vacuum head tilting system 29, as will be further described.

Figure 10:
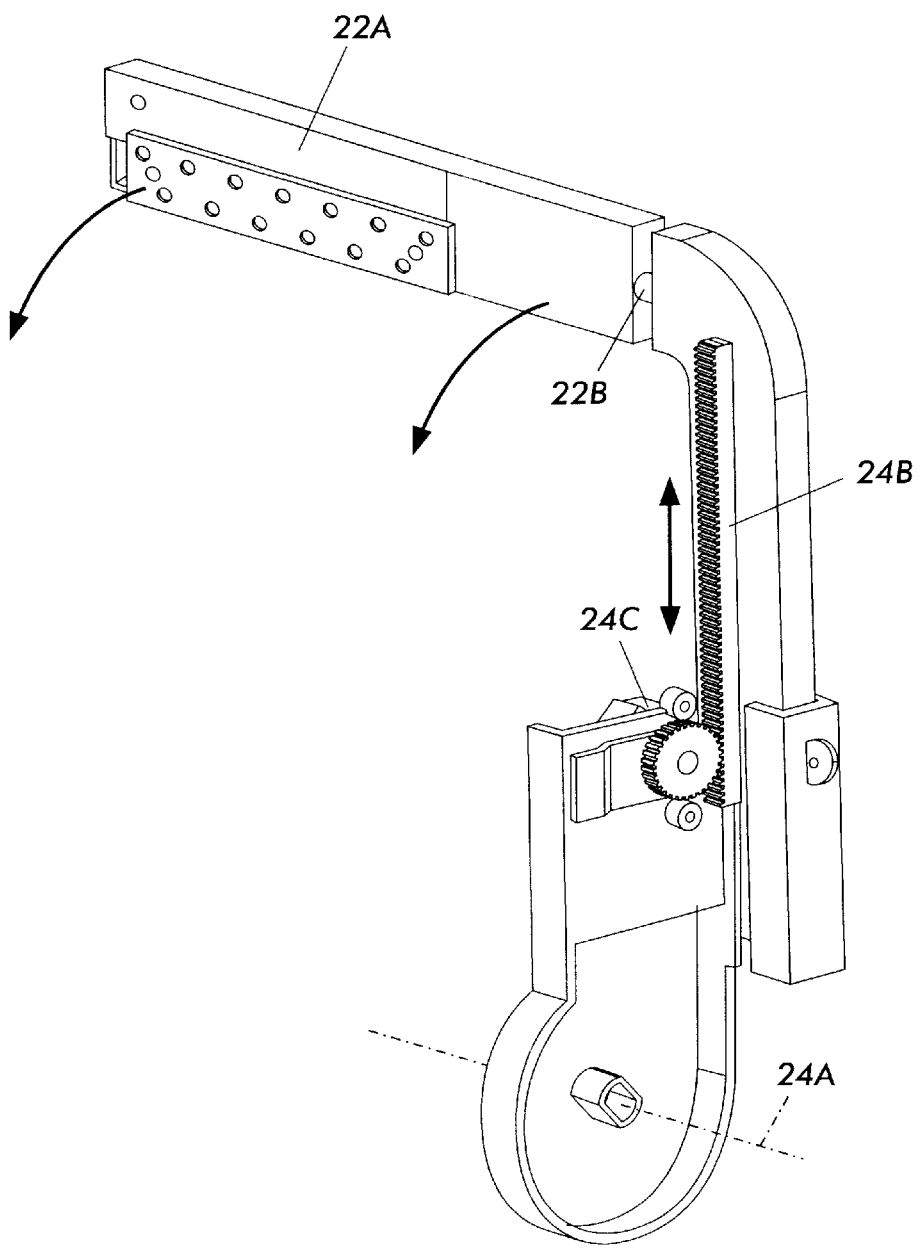
FIG. 10 is an enlarged perspective view of an alternative component of the above embodiments, providing an example of an automatically variable length articulating arm for a vacuum head.

In FIGS. 5–9 there is illustrated an alternative embodiment 30 of the vacuum head system 22 with driven belts 32, to be later described. FIG. 10 shows an alternative articulating arm 24B, pivotable about the same axis 24A, for articulating a pivotally mounted 22B vacuum head 22A, illustrating one example of a motor driven automatically variable arm length system 24C for changing the length of the articulating arm 24B. This shows one way to automatically adjust the extent of page turning over movement for different size books.

Figure 3A:
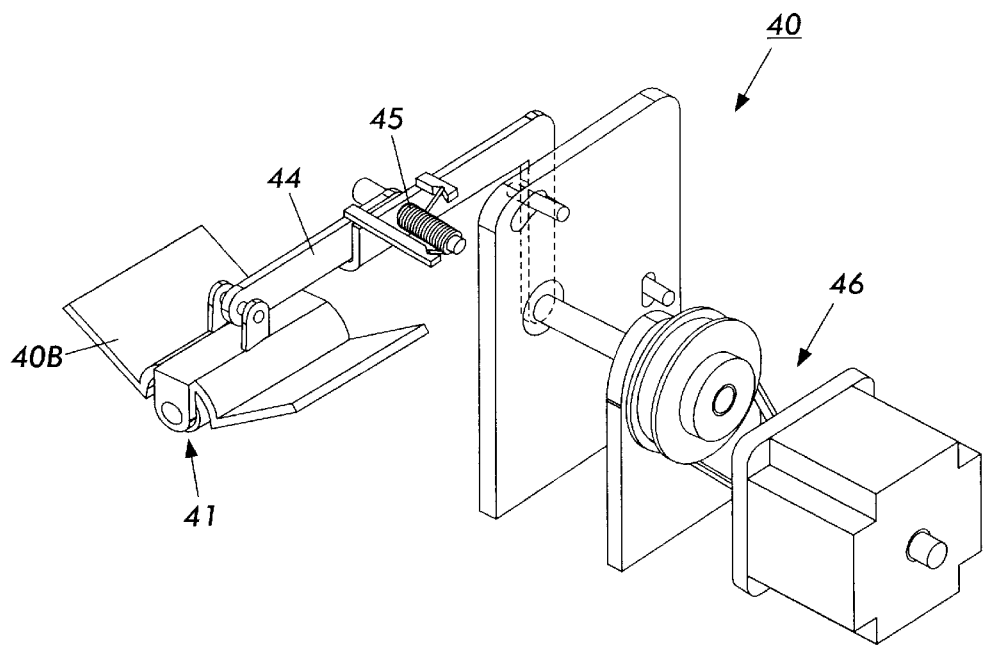
FIGS. 3A and 3B show two views similar to FIG. 2 of two different alternative flattening systems with different book center engaging flattening members.
Figure 3B:
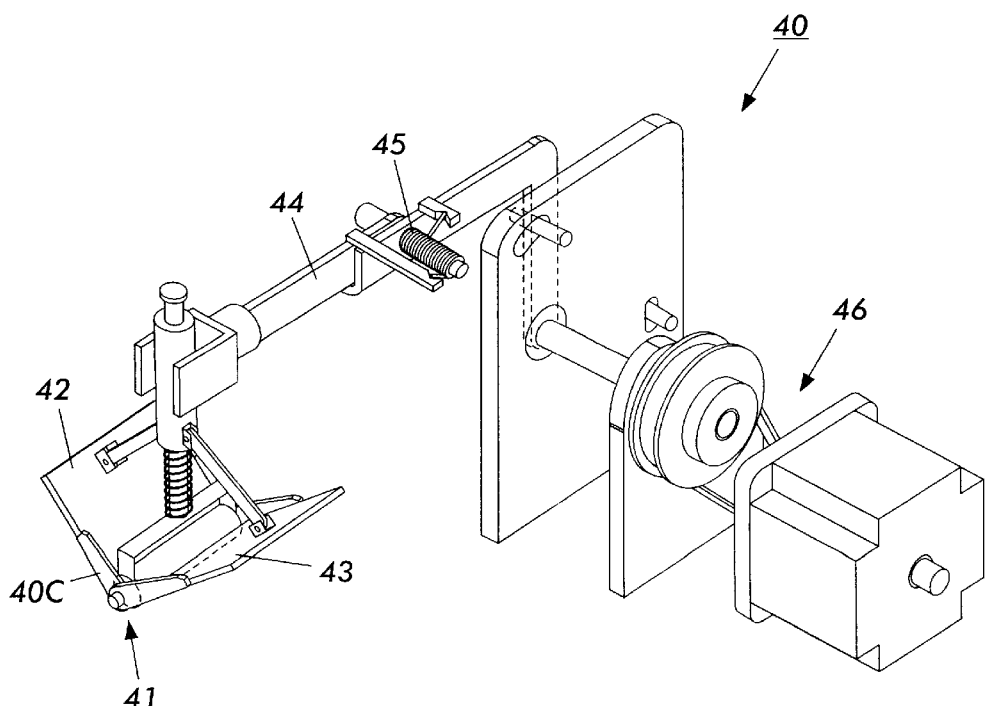

The system 10 example here also includes a coordinated book center pressure flattening system 40. This page flattening system 40 can insure that the just turned over page is lying flat against its underlying pages, and in some cases can also somewhat reduce the curvature or bulge of the normal curved surface of the open book 12. That flattening system 40 is shown with a small pad flattening member 40A in FIGS. 1, 2, 3, 4, 6 and 7, but as shown in FIGS. 3A and 3B, preferably has an angle "V" configuration comprising a centering portion 41 for going into the center of the book 12 gutter, and preferably, as in FIG. 3B, connecting openable flattening portions 42, 43 providing a variable "V" angle which is self-widening to press outwardly on opposite sides of the book. The system 40 may be moved up and down (and even out of the way for imaging) by an articulating arm 44 mounting moved by a driver 46. The system 40 also preferably has a pressure limiting system 45.

As will be further described, the flattening system 40 may be coordinated with a book side clamping system 50, comprising here side edge clamps 51, 52 and clamp activation system 53, 54 driven by clamp drivers 55, 56.

All of said activation systems and drivers and said imaging system may be controlled and coordinated by a programmed controller 100, as previously described.

It will be understood that the descriptions herein of various illustrated embodiments may also apply to other embodiments as well, unless differences are noted or illustrated.

Figure 4:
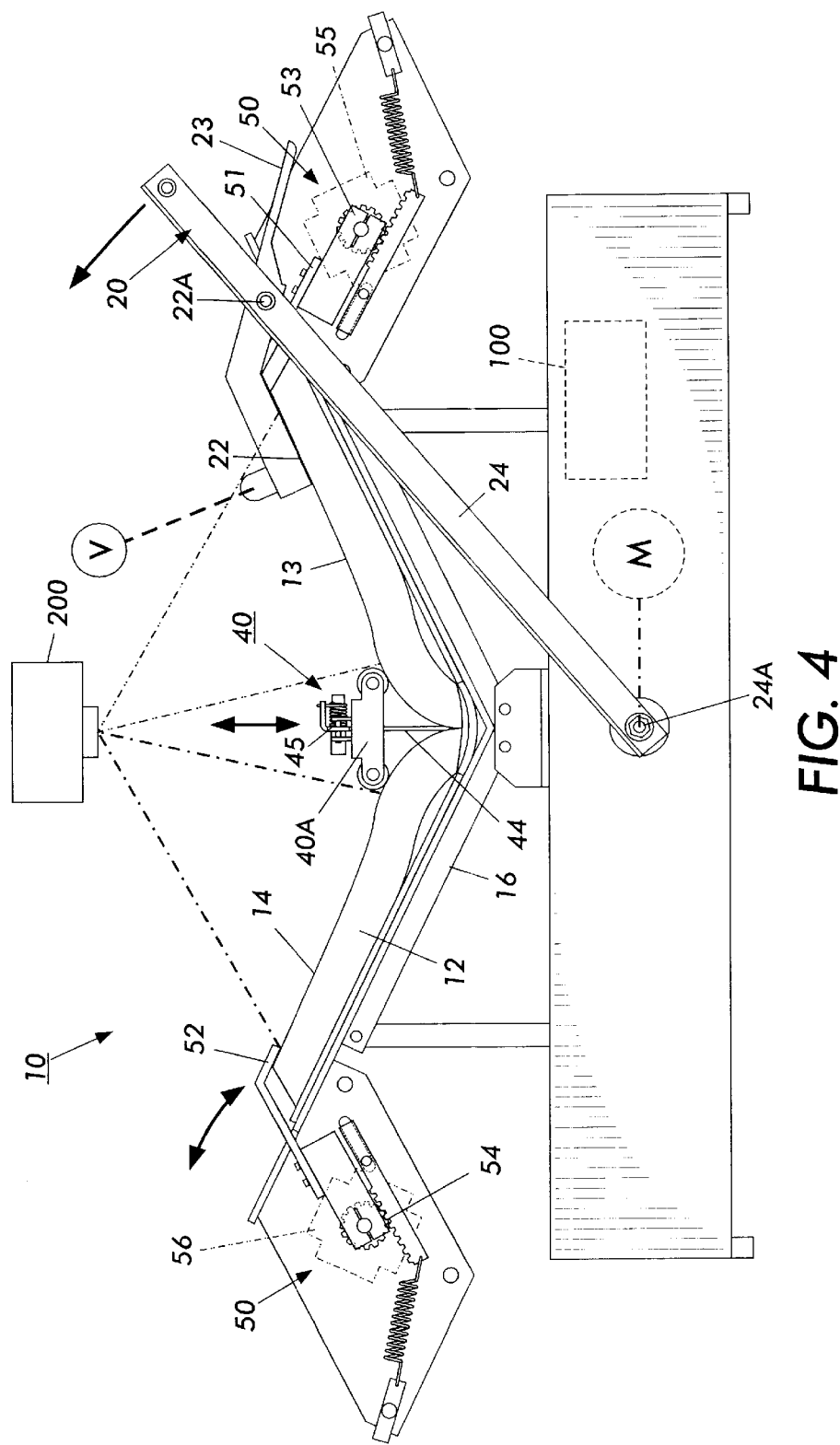
FIG. 4 is a side view of the embodiment of FIG. 1, showing an initial operating position for a page acquisition.
Figure 5:
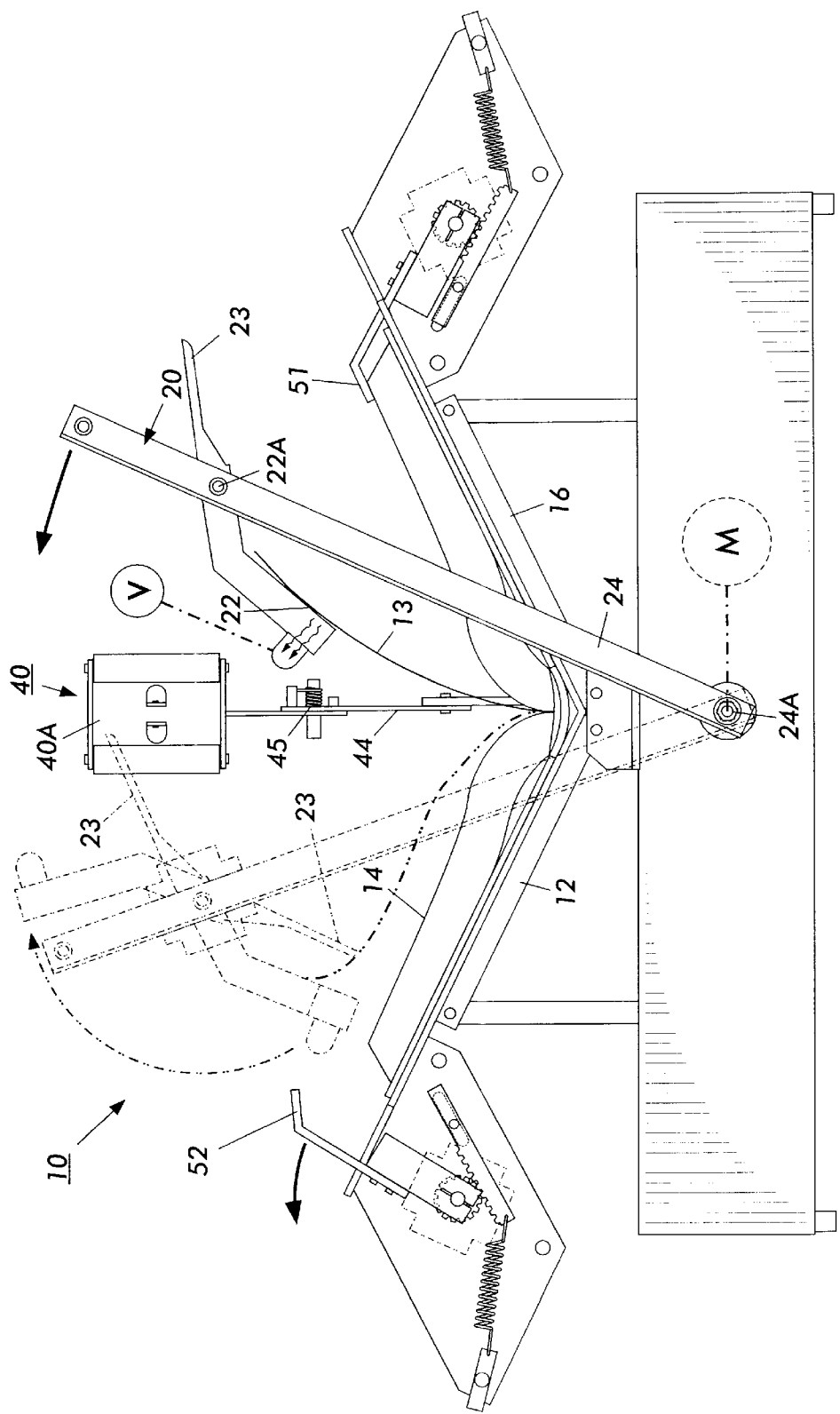
FIG. 5 is the same view as FIG. 4 showing two further operating positions, in solid and phantom lines, respectively.
Figure 6:
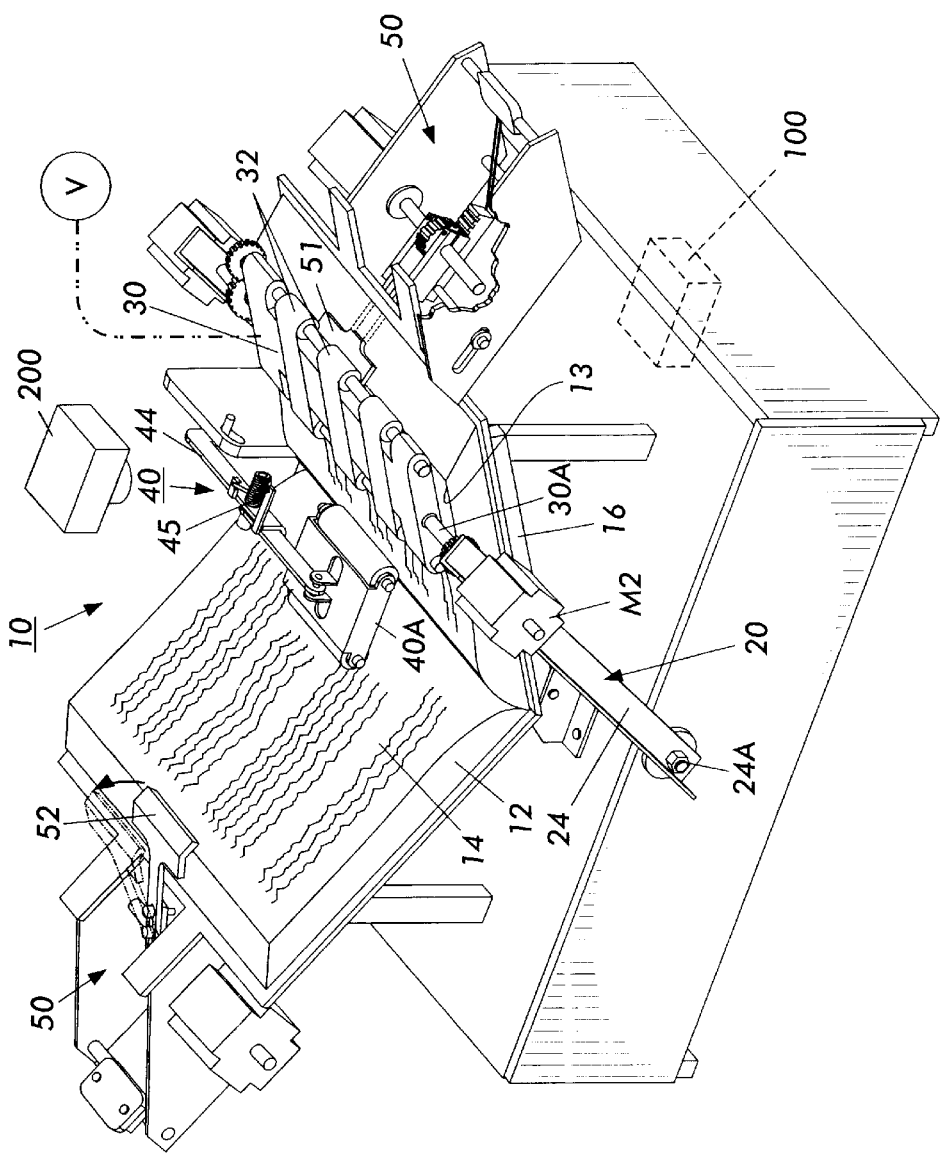
FIG. 6 is a perspective view similar to FIG. 1 but illustrating an alternative sheet acquisition vacuum head with driven feed belts and rotation, (and, in this and FIG. 8, the (optional) flattening system of FIGS. 1, 4 and 5)
Figure 7:
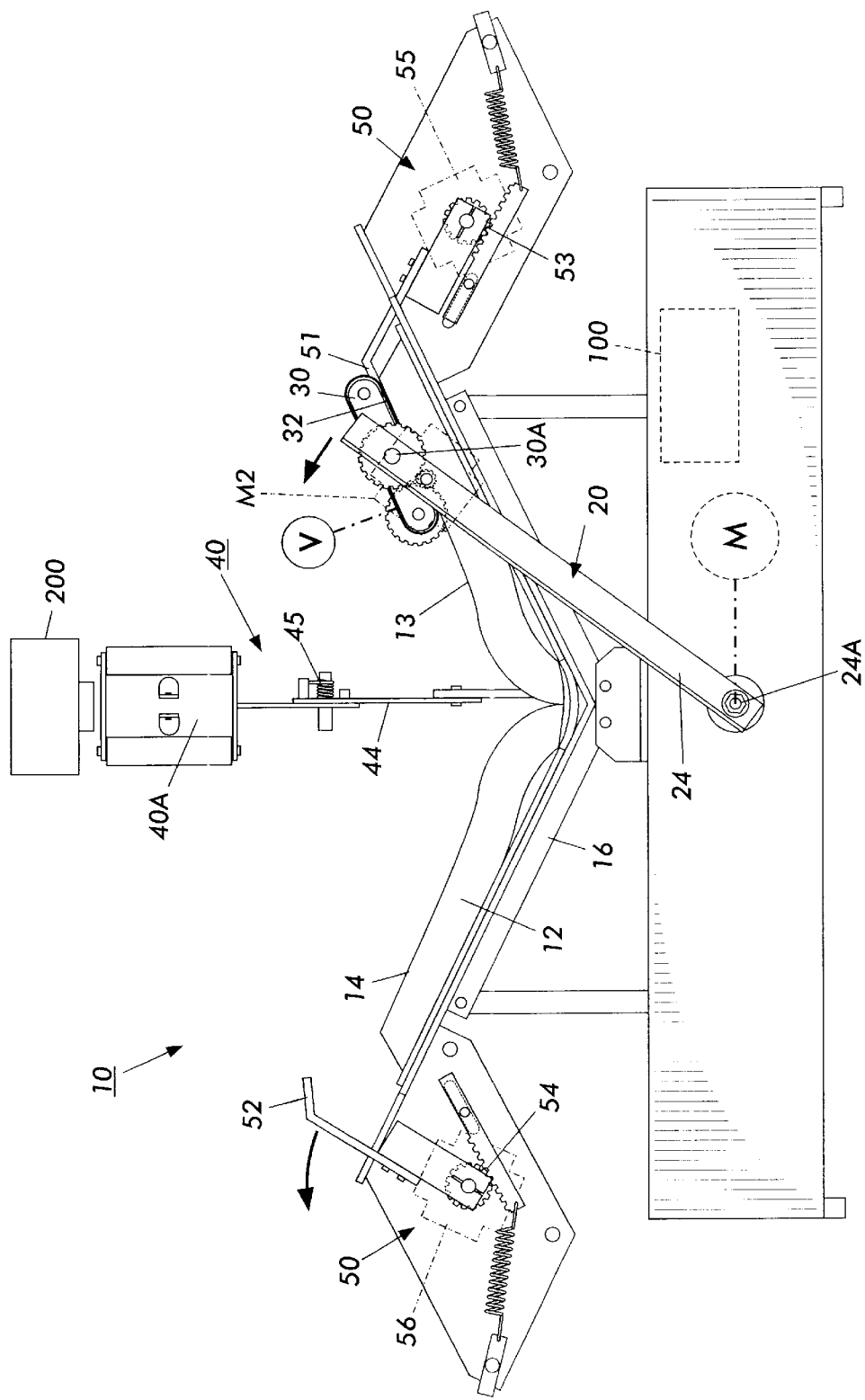
FIG. 7 is a side view of the embodiment of FIG. 6, showing the initial operating position for a page acquisition.
Figure 8:
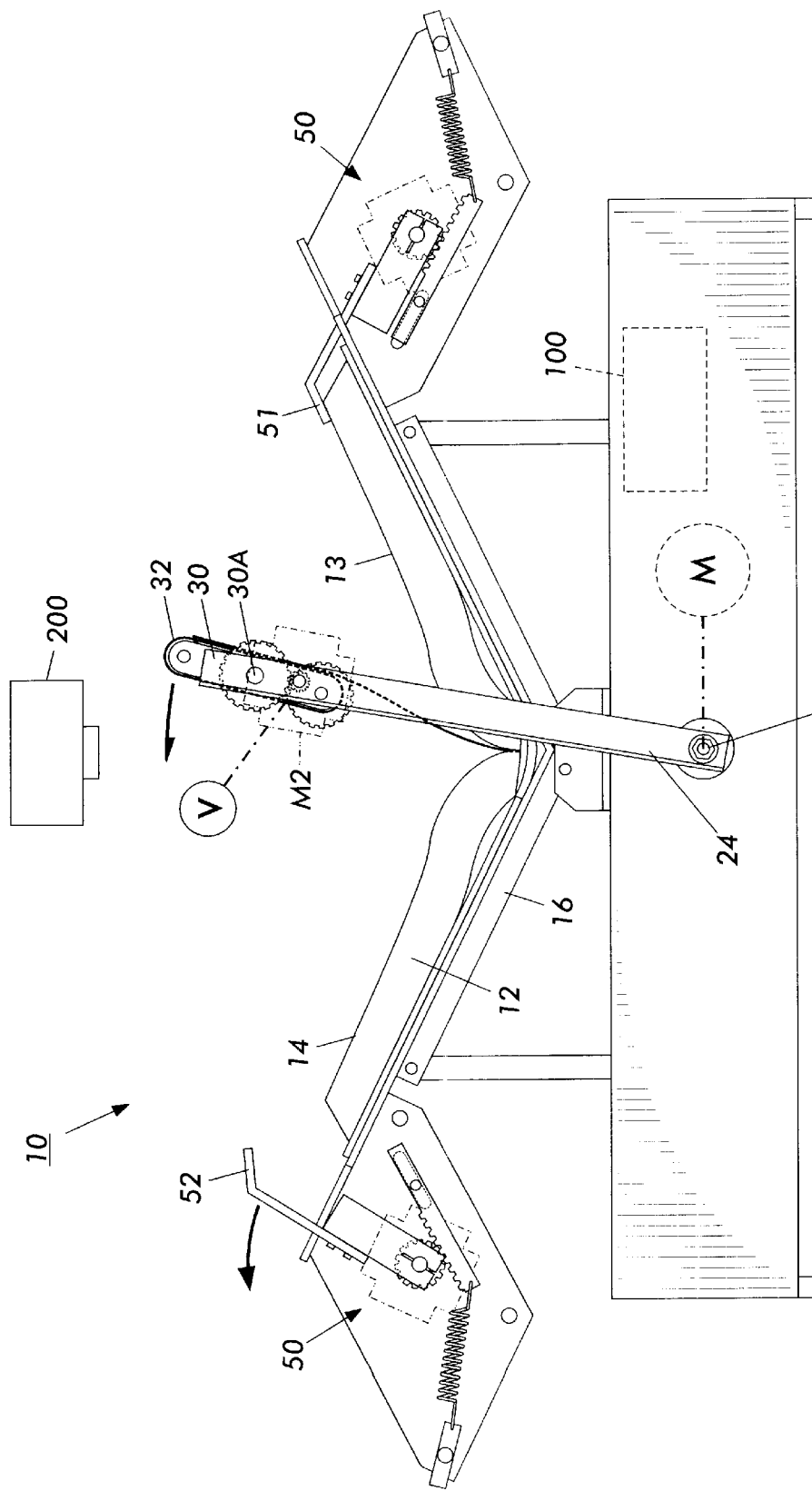
FIG. 8 shows a subsequent operating position of the page turning embodiment viewed in FIG. 7.
Figure 9:
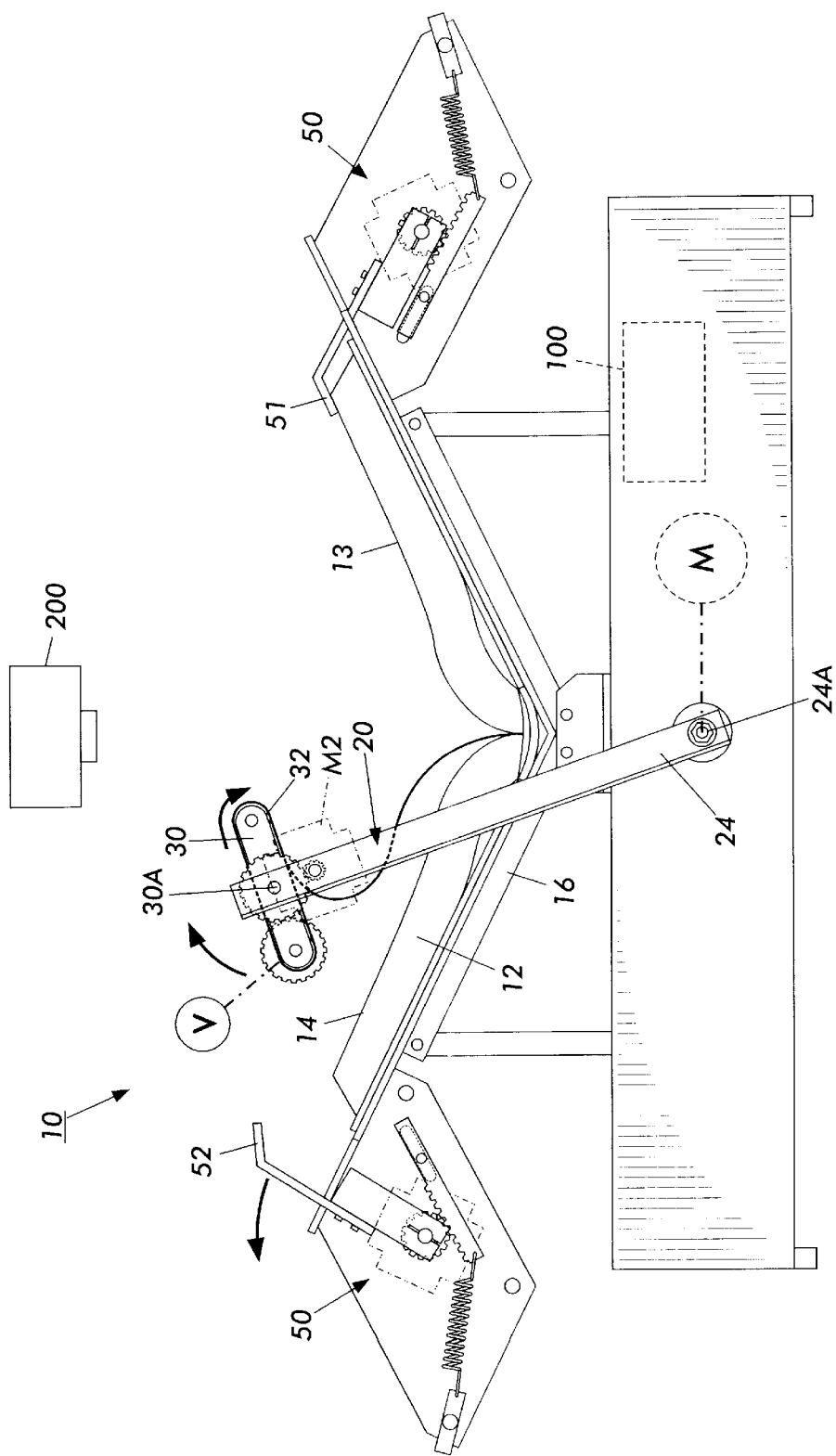
FIG. 9 shows a further subsequent operating position of the page turning embodiment viewed FIGS. 7 and 8.

Turning first to the illustrated page turning system 20 example of FIGS. 1, 4 and 5, it comprises an articulating arm 24 with a pivoting vacuum head system 22 pivotably mounted on the end of that pivoting (articulating) arm 24 at pivot axis 22A. This particular vacuum head 22 embodiment is pivotally mounted to the outer end of the arm 24 using an "L" or "dog-leg" shaped pivot bracket so that the vacuum head 22 pivot axis 22A is below the center line of the arm 24 when the vacuum head 22 is acquiring the sheet to be separated and lifted, as shown in FIGS. 1 and 4. This geometry enables the vacuum head 22 and articulating arm 24 to rotate with gravity with a gentle low force motion that slightly bends the edge of the page up without pulling or tugging on the sheet 13 as it is initially lifted. This bending motion helps create page separation forces between the top page 13 and the underlying pages of the book on that same side of the book. After page separation occurs, while the articulating arm 24 continues to pivot to the other side of the book to turn the page, the vacuum head continues to pivot as shown in FIG. 5. To release the turned page, the vacuum head 22 continues to pivot as shown in phantom lines in FIG. 5 to provide a "peeling" action of the sheet 13 relative to the vacuum head 22. This action causes a rapid vacuum pressure loss in the vacuum head and a natural release of the turned sheet with minimal pull forces.

The vacuum head 22 would simply initially pull on the sheet if the pivot point 24A was not offset to the right, as shown. If the vacuum head pivot axis 22A were in line with articulating arm 24, bending up the right edge of sheet could result in undesirable sheet pull forces. With the vacuum head pivot 22A offset as shown, the sheet 13 edge can be bent up to aid in separation with no tension exerted on the sheet. While this dual axis, dual pivoting, system of vacuum head 22 or 22A relative pivoting can be controlled by the page contact, as described, and gravitationally assisted by the vacuum head pivot axis location relative to its center of gravity, alternatively, a motor can be added for angular control of the pivoting of vacuum head 22, as in the other illustrated embodiment.

After the sheet edge has been initially bent up, an additional conventional air knife or puffer blowing against that area can be used to aid in separation of the underlying pages, if desired. Depending on the media latitude, and the cost constraints for the system, a conventional pneumatic fluffer system blowing against that edge of the book can also be used to aid in the initial acquisition and separation of the pages.

This page turning and stripping may be assisted by a finger or flipper arm 23 extending from the pivoting vacuum head 22 on the opposite side of the vacuum head pivot axis 22A. As the vacuum head 22 rotates over to the other side of the book on its arm 24, this flipper arm 23 automatically rotates with the rotation of the vacuum head 22 to help to flip the turned over sheet down onto the other side of the book.

After the turned-over sheet is deposited onto the other side of the book, the articulating arm 24 returns back to the first side of the book 12 about its axis 24A to acquire the next page sheet with the vacuum head 22. Since the relative heights of the opposite sides of the open book 12 will change as the pages are turned over, a commercially available low force pivot sensor or switch, or a pressure sensor or switch, can be mounted on the vacuum head system 22 to detect the upper surface of the book 12 and stop the vacuum head in the optimum location for page acquisition. That is, to control the motor M via the controller 100. However, the free pivoting of the vacuum head 22 about axis 22A provides considerable latitude.

In the alternative page turning system 20 embodiment of FIGS. 6–9, there is shown an alternative page acquiring vacuum head 30 which can have the same kind of conventional vacuum source "V," but with driven belts 32 for moving the acquired sheet relative to the vacuum head 30 during part of its operating mode. This vacuum head 30 has an apertured vacuum platen surface like the vacuum head 22. It is also pivotable on the arm 24. However, the vacuum head 30 is rotated about a central axis 30A by a small motor M2 (or a belt or gear drive from the arm 24 pivoting drive M). The vacuum head 33 has a surrounding set of (otherwise conventional) frictional feed belts 32 that may be driven by another small internal motor or, as shown, a gear take-off drive from motor M2, to move over the surface of the vacuum platen to feed off the page at a selected point, time or angle during its operation, as shown for example in FIG. 9.

A book page is initially acquired by the vacuum head 30 in essentially the same manner as with the vacuum head system 22, by the vacuum platen of the vacuum head 30 being brought down by the arm 24 to contact or come into sufficiently close proximity to the page 13 to lifted and turned.

The vacuum head 30 is then rotated about the pivot axis 24A (which may be below in the approximate center of the book) by the pivoting of its mounting arm 24 towards the other side of the open book, thereby turning the page. When the page is turned through a predetermined distance (arc), as in FIG. 9, the belts 32 are activated to feed off the engaged page, and concurrently the vacuum plenum is being pivoted about its central axis 30A by motor M2, thereby causing the page to be turned over and delivered to its final location on the other side of the book, but with the vacuum head 30 now on top of rather than under the turned over page.

Once the page is turned completely, the vacuum "V" may be turned off, thus releasing the page. Alternately, the timing of the vacuum head rotation and the movement of the belts 32 can be such as to cause the page to be let go without turning the vacuum off. Since the vacuum head 30 is now located on the other (opposite or upper) side of the page, after the page is so turned, it can feed that page outwardly with the belts 32, and then apply a gentle flattening force from the vacuum head 30 to press that page down into its final location and/or to hold the page down while it is being clamped, to retain the page held relatively flat. The system can then be returned to its initial position for the page(s) to be viewed (read) or electronically scanned. Alternatively, the newly exposed page side of the book can be imaged while the vacuum head 30 is still in the process of turning over and delivering the lifted page to the other side of the book.

In both of said illustrated alternative embodiments, the pivoting of a relatively small vacuum head (which may be broadly read in the claims here to encompass an elastomeric suction cup or known alternative page acquisition system unit or member, such as an electrostatic sheet attraction member), in coordination with the larger reciprocation movement of its longer reciprocating mounting arm, can prevent the vacuum head from ending up underneath the page it has just turned over, as well as protecting that page from undue bending or pulling stresses.

That coordinated dual pivotal movement could be by other means. For example, by a cam drive or a timing belt connecting between a fixed pulley mounted on axis 24A and a different diameter pulley on axis 22A connected to the vacuum head for pivoting the vacuum head in proportion to the pivoting of the arm 24.

Discussed now in further detail are the illustrated embodiments of apparatus and methods of gently flattening and holding the pages of a book flatter for imaging without needing to contact the image areas of the book 12. This can include a book 12 side edge clamping system 50 with book side edge margin clamps 51,52 and a clamp actuation system 53, 54 with motor or solenoid drivers 55, 56. An overall system of both page flattening and page clamping can further comprise a center pressure or flattening system 40. This includes here a relatively small and light weight flattening member such as 40A with outer edge rollers as in FIGS. 1, 2, 4, 5, 6 and 7, or small alternative flattening members 40B as in FIG. 3A or 40C as in FIG. 3B. They can be articulated down onto only the center spine gutter, or margin portion of the book 12 on the end of an articulating arm 44 by a coordinated driver 46. That driver 46 may comprise a small motor or a solenoid, which is controlled by the controller 100 in coordination with the operation of the book side edge clamping system 50. As shown, the arm 44 may be in two parts pivotally connected with spring tension to provide a force limiting system 45 accommodating different book thickness without significantly changing the flattening force, and without exceeding a preset limited maximum desired force on the book.

The alternative embodiments 40B and 40C of the center pressure or flattening member 40A, shown in FIGS. 3A and 3B, all have a V-shaped member with a self-centering edge 41 designed to go down into the center gutter of the open book 12, even as that gutter position changes somewhat as the pages are turned. As shown, a small roller may be provided at that edge 41 to assist this self-centering and further protect the book. For this self-centering the center pressure member preferably has some limited freedom of movement on, or of, the arm 44, so that it can apply central flattening pressure to books opened to any location. Also, the flattening system 40 has limited force and/or variable movement, such as the illustrated force limiting system 45, to accommodate books of different thickness. As shown in the embodiment 40(C) of FIG. 3B, the flattening portions 42, 43 forming the "V" may be articulated to flatten outwardly automatically (opening the "V" further) to aid the flattening.

As noted, the motion of the side clamps and the center pressure member are coordinated to ensure the pages are held flat during imaging, or alternatively one or both side clamps could be released after the center pressure member is actuated. The center member pushes down on the "bulge" in the book and any unflattened upper page. This may be done while both book side clamps are released, or while only the side clamp on one side of the book is released. After that side clamp is actuated and has a secure grip on the upper surface of the outer edge margin of the book, the center pressure member is released (lifted up by the arm 44), thereby leaving the page or pages exposed for imaging.

The addition and coordination of this center pressure member operation with these book side clamps operation enables the pages to be held flatter. This is especially important if the book spine is stiff. Because these side clamps are designed to engage only a small portion of the sheet edge, without the coordinated intermittent center pressure member the "bulge" in the sheets would foreshorten their length, and a much wider side clamp would be required to consistently engage the sheets. This could interfere with accurate imaging of the sheets, and undesirably contact the image area with the clamping members.

However, it may be possible with certain books to be able to image the pages using a disclosed flattening system without requiring clamping. For example, with two of the FIG. 3B automatically expanding "V" flattening members respectively inserted into and held in the upper and lower portions of the unprinted central gutter area of the book during imaging.

To reiterate, an exemplary operation of any of the above exemplary systems may be as follows:

1) With the side clamps and the edge clamps retracted, the user places the book 12 onto the holding cradle 16 and starts the control system 100.
2) The center pressure member moves down onto the book and presses the two sides of the book to a flattened state.
3) The edge clamps actuate to hold the pages in place, and the center pressure member retracts to allow for imaging.
4) The center pressure member comes down again and the side edge clamp on the side from which the page will be lifted should be released.
5) The page turning mechanism separates the page on one side of the book and starts to lift it.
6) The side clamp on that side re-actuates under the lifted sheet, to hold the remaining sheets on that side of the book.
7) The center pressure member is retracted to let the lifted page move past it, and then is lowered again.
8) The opposite side clamp is released and then actuated again to clamp the new sheet.
9) The center pressure member is retracted to allow for imaging, and the process repeats (starting at step 4).

It will be appreciated from these teachings that various alternatives, modifications, variations or improvements therein may be made by those skilled in the art, which are intended to be encompassed by the following claims.

What is claimed is:

1. In a method of book page turning in which the individual pages of a book which is being held at least partially open are sequentially automatically turned over from one side of the book to the other side of the book; the improvement comprising:

sequentially pivoting an elongated pivotally mounted arm from one side of the book toward the other side of the book, turning over individual pages sequentially with a vacuum head which is pivotally mounted on said elongated pivotally mounted arm to move on said elongated pivoted arm from one side of the book towards the other side of the book, said vacuum head automatically pivoting relative to said elongated pivoted arm about a different pivot axis as said elongated pivotal arm moves from one side of the book towards the other side of the book to reduce undesirable forces on the individual book pages being turned over.

2. The method of book page turning of claim 1, wherein said pivotal mounting of said elongated pivotally mounted arm and said pivotal mounting of said vacuum head to said elongated pivotally mounted arm function as a dual pivot system enabling said vacuum head to initially pivot about said pivot axis to bend the edge of an individual page up away from the book to aid in page separation, and then to differently pivot said vacuum head about said pivot axis to help peel the same individual page gently away from said vacuum head and to flip the same individual page over onto the opposite side of the book with further pivotal movement of said elongated pivotally mounted arm.

3. The method of book page turning of claim 1, wherein said pivot axis is offset from said elongated pivotal arm to allow said vacuum head to self-pivot in a selected direction as said elongated pivotal arm is pivoted.

4. The method of book page turning of claim 1, in which said vacuum head initially pivots about said pivot axis to bend the edge of an individual page up away from the book to aid in a page separation, in which said pivot axis for said vacuum head is offset from the centerline of said elongated pivotal arm so that said individual pages are not put in substantial tension when so bending them during said page separation.

5. The method of book page turning of claim 1, wherein said pivoting vacuum head further includes a finger extension that assists in flipping over said individual pages as said vacuum head releases them.

6. The method of book page turning of claim 1, wherein said pivot axis of said vacuum head is adjustable for use with different size books.

7. The method of book page turning of claim 1, wherein said vacuum head is pivoted relative to said elongated pivotal arm by a motor.

8. The method of book page turning of claim 1, wherein said vacuum head is automatically pivoted relative to said elongated pivotal arm in coordination with the pivoted position of said elongated pivotal arm.

9. The method of book page turning of claim 1, wherein said vacuum head has driven feed belts engaging an individual book page being turned over and operated in coordination with the position of the vacuum head to assist in turning over an individual book page.

10. The method of book page turning of claim 1, wherein the book is supported in an at least partially opened manner in a generally V-shaped cradle.

11. The method of book page turning of claim 1, wherein said individual book pages are sequentially imaged after said turning over of said individual pages sequentially by said sequentially pivoting of said elongated pivotally mounted arm with said pivotally mounted vacuum head from one side of the book toward the other side of the book.

12. In a system for automatically turning the individual pages of a book having gutter margins and unprinted outer margin edges, with a book holder for holding the book at least partially open so that the book has first and second open sides, and with a book page turning apparatus for automatically sequentially turning over individual pages of the book from said first side of the book to the second side of the book; the improvement wherein said page turning apparatus for automatically sequentially turning over individual pages of the book from said first side of the book to the second side of the book comprises an elongated arm pivotal from one side of the book toward the other side of the book about a first pivot axis, and an individual book page acquisition member pivotally mounted to said elongated arm to move with said elongated pivoted arm from one side of the book towards the other side of the book, said individual book page acquisition member being pivotally mounted to said elongated arm about a second and different pivot axis to allow said individual book page acquisition member to pivot relative to said elongated arm as said elongated arm pivots from one side of the book towards the other side of the book about said first pivot axis, to reduce undesirable forces on the individual book pages being turned over.

13. The system for automatically turning the individual pages of a book of claim 12, wherein said individual book page acquisition member includes a vacuum head.

14. The system for automatically turning the individual pages of a book of claim 12, wherein said pivotal mounting of said elongated arm with said first pivot axis and said pivotal mounting of said individual book page acquisition member to said elongated arm with said second pivot axis provides a dual pivoting system enabling said individual book page acquisition member to initially pivot about said second pivot axis to bend the edge of an individual book page on the first side of the book up away from the book to aid in page separation, and then to differently pivot about said second pivot axis with further pivoting of said elongated arm about said first axis to help peel the same individual book page gently away from said individual book page acquisition member and to flip the same individual page over onto the second side of the book.

15. The system for automatically turning the individual pages of a book of claim 12, wherein said second pivot axis is offset from said elongated pivotal arm to allow said individual book page acquisition member to self-pivot in a selected direction about said second pivot axis as said elongated arm is pivoted about said first pivot axis.

16. The system for automatically turning the individual pages of a book of claim 12, wherein said individual book page acquisition member is a vacuum head, and wherein said vacuum head is mounted offset from the centerline of said elongated arm to initially pivot about said second pivot axis to bend the edge of an individual book page up away from the book to aid in an individual book page separation in the initial pivotal movement of said elongated arm away from said first side of the book without putting said individual book page in substantial tension.

17. The system for automatically turning the individual pages of a book of claim 12, wherein said individual book page acquisition member is a vacuum head which releases the individual book pages on the second side of the book and further includes a finger extension for assisting in the flipping over the individual pages as released from said vacuum head.

18. The system for automatically turning the individual pages of a book of claim 12, wherein said elongated arm is adjustable in length for use with different size books.

19. The system for automatically turning the individual pages of a book of claim 12, wherein said individual book page acquisition member is automatically pivoted relative to said elongated arm in coordination with the pivotal position of said elongated arm.

20. The system for automatically turning the individual pages of a book of claim 12, wherein said individual book page acquisition member is a vacuum head which automatically releases the individual book pages on the second side of the book and wherein said vacuum head is pivoted relative to said elongated arm by a motor.

21. The system for automatically turning the individual pages of a book of claim 12, wherein said individual book page acquisition member is a vacuum head which automatically releases the individual book pages on the second side of the book, and wherein said vacuum head is pivoted relative to said elongated arm by a motor, and wherein said vacuum head has at least one driven feed belt engaging an individual book page being turned over and operated in coordination with said automatic releasing to assist in turning over an individual book page.

22. The system for automatically turning the individual pages of a book of claim 12, further including an imaging system for sequential imaging of the individual book pages as they are sequentially turned over by said individual book page acquisition member by said sequentially pivoting of said elongated arm from the first side of the book towards the second side of the book.

* * * * *